United States Patent [19]

March

[11] Patent Number: 6,149,363
[45] Date of Patent: Nov. 21, 2000

[54] LIGHTWEIGHT THREADED FASTENER AND THREAD ROLLING DIE

[75] Inventor: Michael U. March, Torrance, Calif.

[73] Assignee: Huck International, Inc., Tucson, Ariz.

[21] Appl. No.: 09/183,209

[22] Filed: Oct. 29, 1998

[51] Int. Cl.[7] .......................... F16B 35/00; F16B 35/04; B21D 17/04; B21H 3/02
[52] U.S. Cl. ...................... 411/366.1; 411/411; 411/424; 72/88; 72/469; 470/10
[58] Field of Search .............................. 411/366.1, 366.3, 411/411, 424, 426; 72/88, 469; 470/10

[56] References Cited

U.S. PATENT DOCUMENTS

| | | |
|---|---|---|
| 302,600 | 7/1884 | Stetson . |
| 446,042 | 2/1891 | Warren . |
| 929,027 | 7/1909 | Schuhman . |
| 1,764,053 | 6/1930 | Reed et al. . |
| 1,907,684 | 5/1933 | Thomson . |
| 1,940,617 | 12/1933 | Temple . |
| 1,966,835 | 7/1934 | Stites . |
| 1,969,796 | 8/1934 | Hoke . |
| 1,988,925 | 1/1935 | Thomson . |
| 2,010,228 | 8/1935 | Gibbs . |
| 2,150,875 | 3/1939 | Caminez . |
| 2,215,930 | 9/1940 | Mahla . |
| 2,243,138 | 5/1941 | Von Till et al. . |
| 2,255,384 | 9/1941 | Hood . |
| 2,303,224 | 11/1942 | Olson . |
| 2,314,390 | 3/1943 | Vellier . |
| 2,321,375 | 6/1943 | Erdman . |
| 2,340,706 | 2/1944 | Somes . |
| 2,418,070 | 3/1947 | Green . |
| 2,740,136 | 4/1956 | Chiaberta et al. . |
| 2,793,884 | 5/1957 | Jungblut . |
| 2,985,898 | 5/1961 | Goude . |
| 3,205,756 | 9/1965 | Ollis, Jr. et al. . |
| 3,245,142 | 4/1966 | Williams . |
| 3,266,363 | 8/1966 | Bronson et al. . |
| 3,396,996 | 8/1968 | Raptis . |
| 3,481,178 | 12/1969 | Wilkins . |
| 3,538,739 | 11/1970 | Orlomoski . |
| 3,664,540 | 5/1972 | Witkin . |
| 3,746,067 | 7/1973 | Gulistan . |
| 3,828,422 | 8/1974 | Schmitt . |
| 3,896,656 | 7/1975 | Orlomoski . |
| 3,915,052 | 10/1975 | Ruhl . |
| 4,034,586 | 7/1977 | Corrette . |
| 4,037,281 | 7/1977 | Reynolds . |
| 4,050,833 | 9/1977 | Briles . |
| 4,157,725 | 6/1979 | Stanaitis . |
| 4,254,809 | 3/1981 | Schuster . |
| 4,258,768 | 3/1981 | Pamer et al. . |
| 4,260,005 | 4/1981 | Stencel . |
| 4,291,737 | 9/1981 | McMurray et al. . |
| 4,326,825 | 4/1982 | Volkmann et al. . |
| 4,485,510 | 12/1984 | Hatter . |

(List continued on next page.)

FOREIGN PATENT DOCUMENTS

| | | |
|---|---|---|
| 204236 | 7/1959 | Australia . |
| 843952 | 7/1952 | Germany . |
| 54-106754 | 8/1979 | Japan . |
| 188372 | 8/1937 | Switzerland . |
| 685703 | 1/1950 | United Kingdom . |
| 857495 | 12/1960 | United Kingdom . |
| 2074280 | 10/1981 | United Kingdom . |
| 2088508 | 6/1982 | United Kingdom . |
| 2114475 | 8/1983 | United Kingdom . |

*Primary Examiner*—Neill Wilson
*Attorney, Agent, or Firm*—Harness, Dickey & Pierce P.L.C.

[57] ABSTRACT

The present invention is to a lightweight threaded bolt type fastener having a shank with a large diameter portion and small diameter portion connected by a transition portion; a thread is roll formed on the small diameter portion and terminates in a run-out section where the thread gradually decreases in root depth and width and with the run-out section being of minimal axial length and being located closely adjacent the transition portion to produce a run-out zone of minimal axial length. A rolling die for forming the thread with minimal thread run-out having ridge segments with tapered end surfaces for providing the run-out thread with an end wall parallel to the transition portion and a method of making the bolt type fastener.

27 Claims, 6 Drawing Sheets

U.S. PATENT DOCUMENTS

| | | |
|---|---|---|
| 4,735,537 | 4/1988 | Rath . |
| 4,764,066 | 8/1988 | Terrell et al. . |
| 4,799,844 | 1/1989 | Chuang . |
| 4,842,466 | 6/1989 | Wheeler et al. . |
| 4,915,559 | 4/1990 | Wheeler et al. . |
| 4,957,401 | 9/1990 | Hatter . |
| 5,039,265 | 8/1991 | Rath et al. . |
| 5,669,746 | 9/1997 | Myers et al. . |
| 5,788,441 | 8/1998 | Karabestos et al. . |

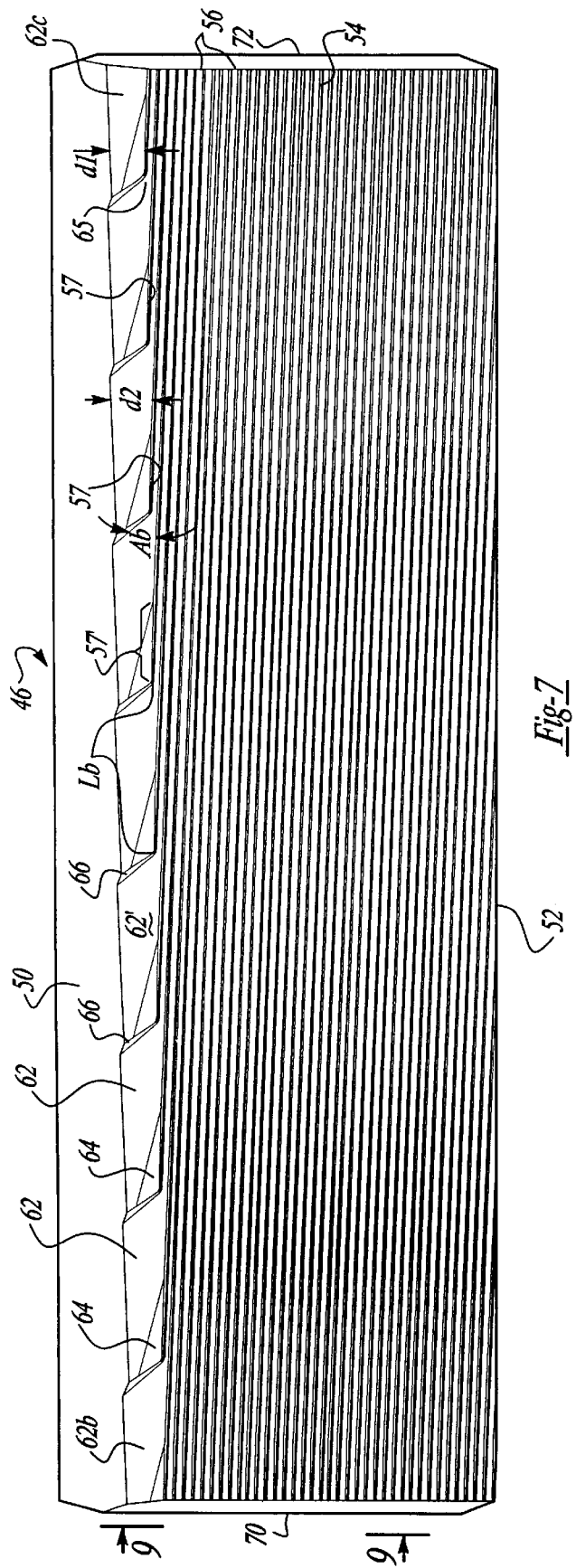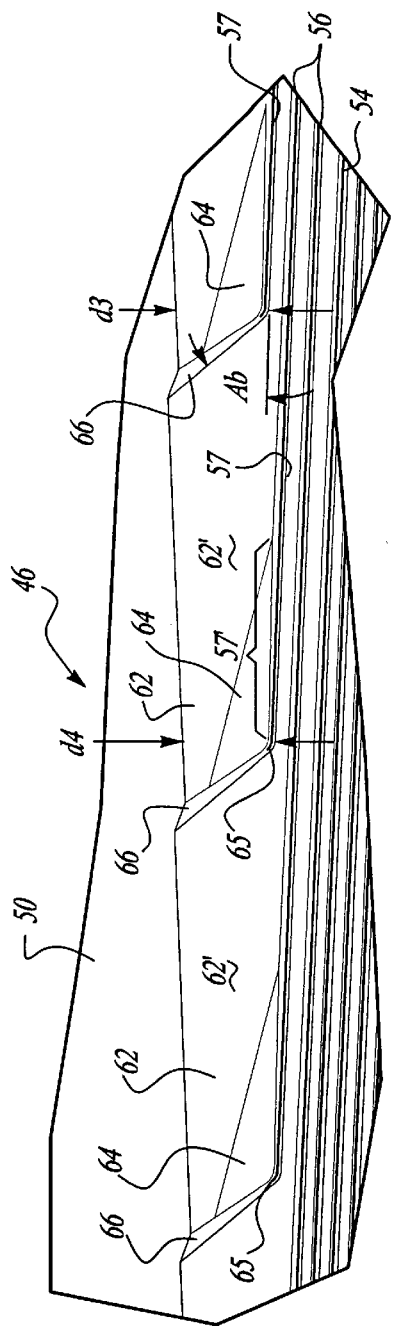

LIGHTWEIGHT THREADED FASTENER AND THREAD ROLLING DIE

SUMMARY BACKGROUND OF THE INVENTION

The present invention relates to lightweight threaded fasteners including a pin or bolt and a nut member and which are of a type particularly useful for aerospace applications and to dies for roll forming an optimized thread form on the pin or bolt.

In the aerospace industry a large number of fasteners such as threaded bolts and nuts, swage type fasteners such as lockbolts, rivets and the like are used in the manufacture of an aircraft. These fasteners can contribute a significant amount to the overall weight of the aircraft. Thus it is desirable to reduce the weight of the fasteners while still providing the necessary strength and other fastening characteristics as required.

In aerospace applications, one type of such threaded fasteners include bolts or pins which have a large diameter smooth, cylindrical shank portion extending from the bolt head and a smaller diameter portion at the opposite end which is threaded. A generally tapered and/or arcuate transition portion connects the larger diameter cylindrical shank portion to the smaller diameter threaded shank portion. The threads on the small diameter shank portion are routinely formed by rolling. The larger diameter smooth shank portion is adapted to be located in the openings of workpieces to be secured together and is intentionally smooth or uniformly cylindrical to maximize shear strength and for other purposes as may be required by the particular application. The threads on the smaller diameter shank portion are formed with crests which are of a diameter which is normally less than the large diameter shank portion to facilitate initial insertion through the workpiece openings. This is especially the case where the large diameter shank portion is dimensioned to provide an interference or very close tolerance clearance fit with the workpiece openings. The fasteners also include a nut member adapted to be threadably secured to the threaded bolt portion with a mating thread form.

It should be understood that the terms "pins" and "bolts" are used interchangeably in the aerospace fastener field for threaded fasteners and thus the use herein of one of the terms includes the other. Roll formed threads on the bolts are believed to have superior fatigue properties relative to bolts with machined or ground threads. Roll forming of bolt threads is a procedure generally well known in the threaded fastener art. A conventional thread rolling die has uniform thread forming ridges and grooves over most of its die face for making a uniform thread. The outer edges of the dies are, however, conventionally somewhat chamfered and/or radiused to remove sharp feather edges to improve wear resistance and increase die life. This chamfer and/or radius will result in the formation of the thread with a run-out section on the reduced diameter blank portion on which the rolled threads are formed. In such run-out sections the root depth and the crest height of the thread decrease to the end of the thread. The axial lengths of such run-out sections are typically measured from the center of the root of the adjacent fully formed thread of full root depth and full crest height to the center of the root at the end of the run-out.

Thus in the routine run-out section the thread is shallower than in the preceding threaded portion of the bolt where the thread is fully developed. Likewise, the crest of the thread, including the flanks which carry the tensile clamp load, in the run-out section will not be fully developed. At the same time, the nut member used with the bolt has a mating thread which when formed normally has a conventional run-in section at its leading end. In the run-in section the nut thread also is not fully formed with the minor diameter being increased resulting in the depth of the run-in thread being reduced. The form and extent of such bolt thread run-out and nut thread run-in and the extent of their effective engagement and/or overlap will have an affect on the overall length of the pin and nut as well as the amount of the overall tensile strength contributed by those sections.

In the aerospace industry since the contribution by the engagement, if any, of the run-out and run-in sections to the overall tensile strength of the fastener is routinely minimal at best, it has been an objective to limit the length of the run-out section of the bolt thread. A contributing factor to this objective is the fact that it has been common for the thread forms of the thread run-out and nut run-in to be such as to have interference when overlapping and hence such overlap is avoided requiring sufficient length of the bolt and nut to compensate as will be described. In this regard, however, it is still desirable to be able to have as much overlap as possible of the nut thread run-in with the bolt thread run-out without interference. At the same time it is also desirable to minimize the axial length of the large to small diameter transition portion. This is done in an effort to reduce the overall length and hence weight of the bolt and nut member. The combined axial length of the run-out section of the bolt thread and the adjacent section of the transition portion is referred to as the "run-out zone". In the past this has typically been in the range of around 2.0 P—where "P" is the thread pitch. In these cases the axial length of the run-out section on the bolt has typically been between around 1.0 P to around 1.5 P. At the same time, the conventional run-in section for the nut thread typically extends for a length of around 0.5 P.

As a practical, economic matter, it is common for a single fastener to be used to secure workpieces varying in total thickness with the maximum total thickness being referred to as the "grip" or "maximum grip" of the fastener and the minimum total thickness being the "minimum grip". Where the bolt of the fastener has a flush head, the "grip" or "maximum grip" is measured from the outer end of the flush head up to the end of the uniform smooth shank portion or up to a predetermined point within the transition portion coincident with the maximum grip for lightweight bolts or pins. For other head styles, such as a protruding head, the "grip" or "maximum grip" is measured from the beginning of the cylindrical, smooth shank portion up to the same noted locations described for the flush head. The plane corresponding to the maximum thickness of parts to be held by a bolt is sometimes also referred to as the "maximum grip" or "maximum grip plane". At the same time the plane corresponding to the minimum total thickness to be secured is sometimes referred to as the "minimum grip" or "minimum grip plane". In aerospace applications, in order to provide a reasonable range of grip capability and minimize excess weight, the difference between "maximum grip" and "minimum grip" for a single sized fastener is typically limited to $\frac{1}{16}$ inch. For example, in aerospace applications where the total or maximum workpiece thickness for a single sized fastener is one quarter of an inch, the minimum grip for that fastener is one-sixteenth inch less than the maximum grip.

Thus where the total thickness of the workpieces is at maximum grip the transition portion will extend or protrude at least partially past the outer surface of the workpieces from the predetermined point. Where the total thickness of the workpieces is less than the maximum grip, the outer end of the smooth cylindrical shank portion and the entire transition portion will extend or protrude past the outer surface of the workpieces. Thus the threaded nuts used with such aerospace fasteners typically have an enlarged diameter counterbore at one end which is concentric with the threaded bore through the nut. The counterbore is sized to receive the protruding end of the smooth shank portion and transition portion without interference in all grip conditions from maximum grip to minimum grip. Consequently the axial length or depth of the counterbore in conventional threaded nuts is such that when fully tightened on the bolt, the threaded portion of the nut, including the nut run-in section, does not extend completely into the bolt run-out section. With such conventional fasteners if the nut thread including the run-in section were to extend into and completely overlap the run-out section there could be thread interference between the fully formed nut thread and the incompletely formed shallow root of larger diameter of the bolt run-out thread. This is, to some extent, because the length of the nut run-in of 0.5 P is less than the bolt run-out and the contour of the fully formed nut thread may not match or be otherwise compatible with the bolt thread run-out. Such interference could impede the nut from being properly tightened in securing the parts being fastened and/or create undesirable stress on the bolt and/or nut. As will be seen this is substantially improved with the fastener of the present invention. In this regard it should be noted that it is common for the fully formed threads of the nut and bolt to be made to have a slight clearance between their respective thread forms, i.e., roots and crests; thus this clearance could permit the nut thread including the run-in section and adjacent fully formed nut thread to extend somewhat farther into the bolt thread run-out section without interference.

The depth of the nut counterbore in a conventional aerospace fastener is the difference between the maximum grip and minimum grip of the bolt with about 2.0 P added to accommodate for run-out and other dimensional tolerance variations. This has been done with such conventional fasteners so that when the nut is used to secure workpieces of the minimum grip, the axially inner end or beginning of the nut thread run-in is at the axially outer end or beginning of the bolt thread run-out, which in the example noted, would be a distance of about 2.0 P from the maximum grip plane of the bolt which is proximate to the end of the cylindrical shank or maximum grip plane of the bolt. When the nut is used to secure workpieces having the maximum grip, the thread at the inner end or beginning of the nut run-in stops at about the length of the "difference" between the maximum and minimum grips plus around 2.0 P from the outer end or beginning of the bolt thread run-out.

Thus it can be seen that, if the length of the bolt thread run-out zone is reduced, the length of the counterbore on the nut could be correspondingly reduced. This would permit a reduction in the overall length of the nut and could also result in a corresponding shortening of the bolt. Because of the large number of fasteners used in an aircraft, the total weight savings per aircraft by reducing the length of the nut and bolt, separately or together, by even slight amounts could be significant.

One approach to reducing the length of the bolt thread run-out section has been to form a bolt blank with a relief groove in the section between the transition portion from the large diameter, smooth shank portion and the smaller diameter portion on which the threads are to be rolled. The groove is approximately formed to the minor diameter of the thread to be produced. Here the groove, which is cut prior to rolling the thread, is then rolled to increase its strength by eliminating tool marks induced by machining. The thread is then rolled, with what would be the thread run-out of a formed thread extending into the groove. This results in an actual thread run-out section which is shorter than that of prior conventional fasteners with a rolled thread. This type of bolt and thread form is generally as shown in U.S. Pat. No. 4,485,510 issued Dec. 4, 1984 and U.S. Pat. No. 4,957,401 issued Sep. 18, 1980 to Hatter for "Threaded Fastener Having Minimized Length And Weight And Method To Make It". It can be readily understood, however, that these extra steps in cutting and rolling the groove could result in increased expense over a bolt in which the threads are simply roll formed without such a relief groove. With such latter bolts it is understood that from the maximum grip plane the relief groove is within 1.0 P but that a full thread with a full crest is within 1.5 P.

In contrast another, subsequently developed, form of bolt for a lightweight fastener has a rolled thread with an effective run-out zone of only about 1.0 P where both the root and crest are fully formed. Here a special rolling die is used which, instead of tapering the depth of the root of the thread in the run-out section, forms a thread of full depth to within 1.0 P of the maximum grip plane. The run-out section is formed generally in a section of the transition portion which connects the large diameter shank portion to the smaller diameter shank portion on which the rolled thread is fully formed and is of a maximum length of one-quarter, and usually less, of the circumference at the pitch diameter. The root of the thread in the transition portion is generally of full depth except at the end of the run-out where it increases abruptly to the larger diameter of the transition portion at that location. This has permitted reduction of the total length of the nut and bolt by around 1.0 P from a conventional nonlightweight fastener. This type of bolt is generally as shown and described in U.S. Pat. No. 4,785,537 issued Apr. 5, 1988 to Rath for "Thread Rolling And Fastener". Here the run-in of the conventional nut thread does not match the minimal, abrupt run-out of the bolt thread at the large diameter shank portion. In one commercial form of that fastener the run-out is formed on the smaller diameter shank portion and sharply increases at the end but somewhat less abruptly. However, such abrupt run-outs can be functionally accommodated by the nut counterbore and normal nut thread clearance whereby the same nut with the conventional nut thread run-in still can be used here as well as on the previously noted bolt with the relief groove whereby bolts of both constructions can be used interchangeably with a common nut member.

In addition to the preceding, there are a number of other patents directed to bolts with a thread run-out of various forms and lengths between the larger diameter smooth, cylindrical shank portion and the fully developed threaded portion. For example see U.S. Pat. No. 4,842,466 issued Jun. 27, 1989 to Wheeler et al for "Lightweight Fastener" in which the bolt is constructed with a thread run-out zone of between 1.6 P to 2.0 P which falls generally within a triangular envelope; the nut thread is specially formed to have a matching conical run-in. See also U.S. Pat. No. 4,915,559 issued Apr. 10, 1990 to Wheeler et al for "Lightweight Fastener" in which the bolt thread run-out zone is between 1.58 P to 1.8 P and follows a concave curve with the nut thread being specially formed to have a matching convexly curved run-in. In addition see U.S. Pat. No. 5,039,265 issued Aug. 13, 1991 to Rath et al for "Lightweight Fastener" in which the bolt thread run-out zone is between 1.4 P to 2.3 P and follows an S-shaped curve with a concave portion and with the nut thread crests being truncated to match. With these latter fasteners, it would appear that a nut with a conventional thread run-in would not be suitable and that different nut members with specially adapted run-ins would be required. Likewise, it would appear that these different nut members would not be readily useable with the bolts of the cut groove or abrupt run-out type previously described and hence, where a nut member of one design is to be used, the bolts with the cut groove or abrupt run-out would not be used interchangeably with those of the '466, '559 and '265 patents as described above.

U.S. Pat. No. 5,788,441 is directed to a threaded bolt with a rolled thread in which the thread in the run-out section extends helically with the depth of the thread decreasing from full thread depth to no thread depth within one-third of the circumference of the rolled thread at its pitch diameter. Here, however and as with the '265 patent noted above, the thread run-out is formed on a separate, transition shank portion which differs in diameter from both the large diameter smooth shank portion at one end and the small diameter shank portion with fully formed thread at the other end. The threaded bolt of the '441 patent would appear to be adapted for use with the same nut member as the bolts of the cut groove or abrupt run-out.

In the present invention a threaded fastener is provided in which the thread is roll formed on a reduced, uniform diameter shank portion of a bolt blank. At the same time a unique thread run-out section is formed solely on the same reduced diameter shank portion and is of a minimal total length extending axially from the beginning of the thread run-out section for no greater than around ¼ P. In this regard the thread run-out section extends circumferentially for no more than between around ⅓ to around ½ of the circumference of one thread pitch. Here the root depth and crest height decrease gradually to a relatively smooth, arcuate termination at the end of the run-out section. The full thread and the run-out thread, however, are all, advantageously, formed on the reduced, uniform diameter shank portion. At the same time the run-out section is of a unique construction having an end wall extending parallely and located closely adjacent to the generally tapered or arcuate transition portion which connects the large diameter, smooth pin shank portion to the reduced diameter threaded shank portion. In addition the present invention permits the axial length of the transition portion to be minimized. With the fastener of the present invention constructed as noted above, the run-out zone, as previously defined, can be minimized to have a fully formed thread at a maximum axial distance from the maximum grip plane of no greater than 1.0 P. The minimal run-out zone formed by the limited run-out section and the included section of the arcuate, tapered transition portion along with the overall reduced axial length of the transition portion provide a bolt of minimal size and weight. While the run-out section is quite limited, it readily permits the use of a nut with a conventional thread run-in and with a counterbore of reduced depth. This results in a fastener assembly of a bolt and nut of minimized overall axial length and weight. This also permits the interchangeable use of the bolt of the fastener of the present invention with the previously described bolts with the relief groove, bolts with the abrupt run-out and those with a tapered run-out on a separate transition portion through a common nut member with the conventional run-in.

In the present invention a uniquely constructed rolling die is utilized to roll form the bolt or pin thread with this desired run-out. In the thread rolling die of the present invention, ridge segments at the upper or outer edges of the dies are formed on a plurality of stepped beveled surfaces and the upper flanks are tapered at one end to provide a gradual run-out avoiding the formation of a run-out generally as an abrupt end wall. At the same time the upper ridge segments on the thread-rolling dies of this invention do not come to a feather edge as they run out on the edge of the die where the inner end of the thread is formed. Rather the run-out sections at the upper ridge segments extend for a relatively short distance with the inner flank being parallel to the confronting flank of the opposite die ridge. Also, by forming the run-out on the same reduced diameter shank portion as the full thread, die life is not impaired and is believed to be improved. In this regard it is common in prior constructions, where the run-out section extends into a portion of the blank of different diameter than that where the full thread is formed, for laps, folds and other undesirable features to be generated as a consequence. Such undesirable features are minimized in the present invention where the run-out section is formed totally on the same small diameter portion as the full thread.

Thus it is an object of the present invention to provide a lightweight threaded fastener including a bolt which has a threaded shank portion with a unique, gradual run-out of minimal length and a fully formed thread root and crest within one pitch, 1.0 P, of the maximum grip plane.

It is another object of the present invention to provide such a lightweight fastener in which the run-out section of the bolt thread extends gradually for an axial length of no greater than around ¼ P and circumferentially for no greater than from around ⅓ to ½ of the circumference at the pitch diameter.

It is still another object of the present invention to provide a lightweight threaded fastener in which the run-out section of the thread of the bolt is of a unique form of limited length and can be used with a nut having a mating thread with a conventional run-in of about 0.5 P.

It is another object of the present invention to provide a lightweight threaded fastener including a bolt in which the thread run-out is formed totally on the same small diameter shank portion as the full threads whereby laps, folds and other undesirable features are minimized.

It is an object of the present invention to provide a lightweight threaded fastener in which a bolt has an enlarged diameter smooth shank portion connected to a small diameter shank portion by a smooth transition portion of minimal length and with a thread, including a unique, short run-out section, formed substantially solely on the reduced diameter shank portion.

It is an object of the present invention to provide a lightweight threaded fastener in which a bolt has an enlarged diameter shank portion connected to a smaller diameter shank portion by a smooth transition portion of minimal length and with a thread, including a unique short run-out section, formed substantially solely on the reduced diameter shank portion and extending for an axial length of no greater than around ¼ P and located closely adjacent to the transition portion to provide a run-out zone of minimal axial length of from around ⅔ P to no greater than 1.0 P.

It is an object of the present invention to provide a lightweight threaded fastener in which a bolt has an enlarged diameter smooth shank portion connected to a small diameter shank portion by a smooth transition portion of minimal length and with a thread, including a unique, short run-out section, formed substantially solely on the reduced diameter shank portion and extending for an axial length of no greater than around ¼ P and circumferentially for a distance of between around ⅓ to around 0.5 of the circumference at the pitch diameter and which can be used with a nut having a conventional run-in of about 0.5 P of a contour generally matching and/or compatible with the bolt run-out.

It is another object of the present invention to provide a lightweight threaded fastener in which a bolt has an enlarged diameter smooth shank portion connected to a small diameter shank portion by a smooth transition portion of minimal length and with a thread, including a unique, short run-out section, formed solely on the reduced diameter shank portion and with the run-out section having an end wall extending parallely and being closely adjacent to the transition portion whereby the axial length of the run-out zone is minimized.

It is still another object of the present invention to provide a rolling die of a unique construction to roll form the thread on a shank portion of a bolt having the unique gradual run-out of minimal length as noted and with the full thread and thread run-out formed on a common shank portion which is of a substantially uniform diameter.

Other objects, features, and advantages of the present invention will become apparent from the subsequent description and the appended claims, taken in conjunction with the accompanying drawings, in which:

DESCRIPTION OF THE DRAWINGS

FIG. 7 is a front elevational view of a rolling die of the present invention for roll forming the thread of the bolt of FIGS. 1 and 2 onto the bolt blank of FIG. 6;

FIG. 8 is an enlarged fragmentary perspective view of a portion of the upper edge of the thread rolling die of FIG. 7;

DESCRIPTION OF EMBODIMENTS OF THE INVENTION

Looking now to FIGS. 1–5, a lightweight threaded fastener 10 is shown and is an assembly which includes a threaded pin or bolt 12 and a threaded collar or nut member 14. The fastener 10 can be used to secure workpieces together varying in total thickness from a predetermined maximum total thickness to a predetermined minimum total thickness. The fastener 10 is shown securing workpieces 16 and 18 of maximum total thickness in FIG. 4 and workpieces 16' and 18' of minimum total thickness in FIG. 5.

Figure 1:
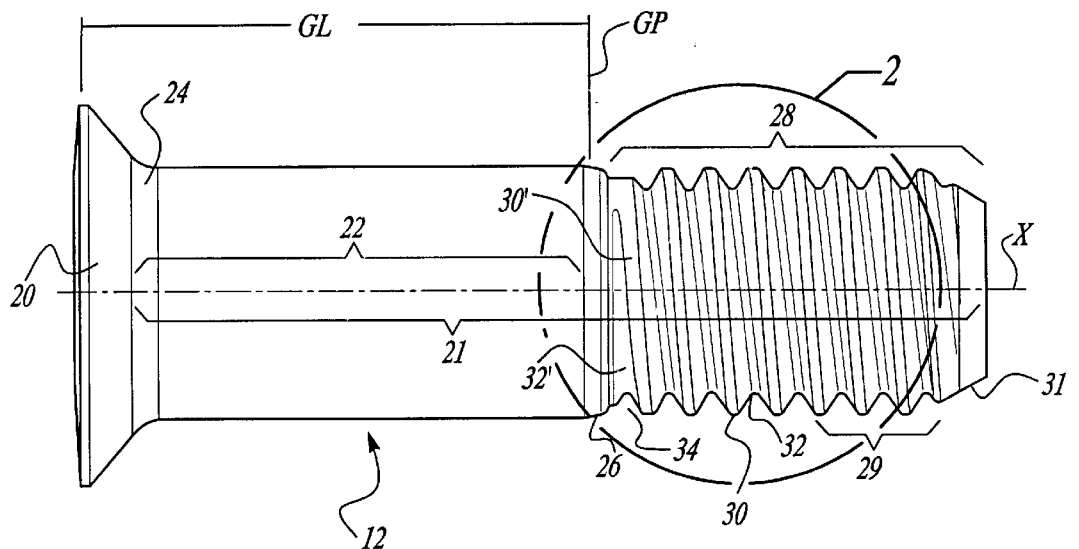
FIG. 1 is a longitudinal sectional view of a threaded bolt made in accordance with the present invention.
Figure 2:
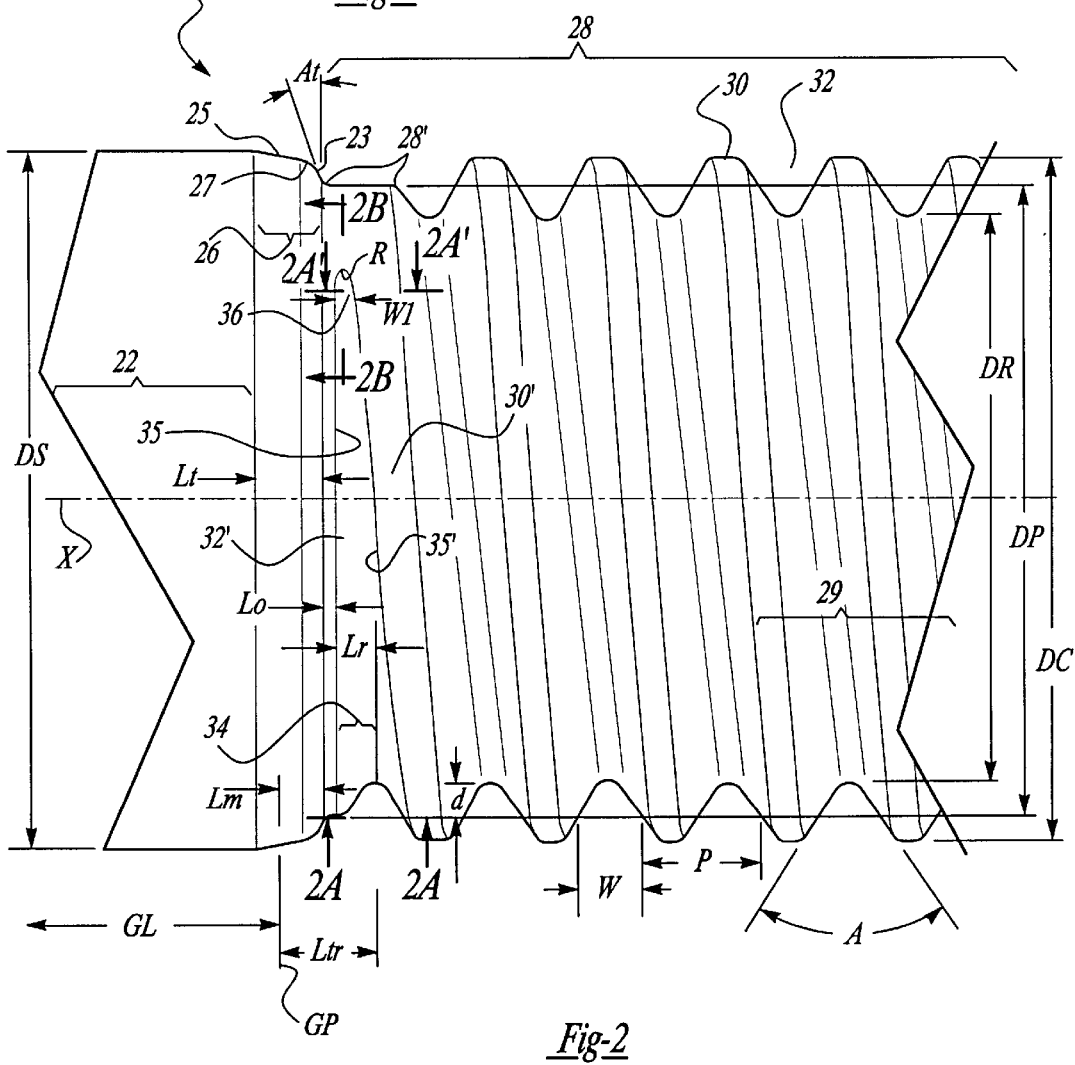
FIG. 2 is an enlarged fragmentary elevational view, showing the inner end of the bolt thread, including the thread run-out section, of the bolt of FIG. 1 and generally taken in the Circle 2 in FIG. 1.

Looking to FIGS. 1 and 2, the bolt 12 includes a flush head 20 and a shank 21. While a flush head type bolt 12 is shown and described it should be understood that the present invention is equally applicable with bolts with other head forms such as a protruding head. The shank 21 includes a large uniform diameter cylindrical, smooth shank portion 22 with a radiused section 24 connecting it to the head 20. The shank 21 also includes an arcuately convex and tapered relatively short transition portion 26 which connects the large diameter smooth shank portion 22 to an axially outer shank portion 28 of a reduced diameter on which threads 29 are formed. The shank portion 28 terminates at its outer end in a chamfered section 31. In securing the workpiece 16, 18 or 16', 18' together the shank 21 is located in openings 17, 19 or 17', 19' with the flush head 20 located in a mating countersunk bore portion 48 or 48'.

Looking now to FIG. 2, the transition portion 26 includes a first arcuate section 25 of generally large radius which extends gradually radially inwardly from the adjacent end of the enlarged diameter shank portion 22 to a second reduced arcuate section 27 of smaller radius which smoothly connects the first arcuate section 25 to a generally straight tapered section 23 which in turn is connected to an unthreaded section 28' of the original or unrolled base diameter of the small diameter shank portion 28 by a conventional fillet radius. As will be seen the transition portion 26, which is of a relatively large average diameter is of a minimum length Lt resulting in a reduction in weight of the bolt 12.

The transition portion 26 not only provides for a smooth, gradual connection from the large diameter shank portion 22 to the small diameter shank portion 28 but also provides the arcuate surface of section 25 which assists in the insertion of the bolt 12 into workpiece openings especially in close tolerance or interference fit applications with workpiece bores such as bores 17, 19 or 17', 19'.

The overall or maximum grip length GL of the bolt 12 is the distance from the outer surface of the flush head 20 past the beginning of the transition portion 26 to a predetermined point thereon. The predetermined point on the transition portion 26, which is coincident with the maximum grip plane GP, is located slightly past the end of the large diameter shank portion 22 by an industry accepted amount which will vary with the size of the bolt 12. This defines the maximum grip plane, GP, for the fastener 10 when used in the maximum grip condition such as with the workpieces 16 and 18 of FIG. 4. The threaded shank portion 28 is of a predetermined length to provide sufficient engagement with the threads of the nut member 14 in both the maximum grip condition of FIG. 4 and minimum grip condition of FIG. 5 with the minimum grip plane being GP'. Thus the maximum grip plane GP is in line with the outer surface 44 of workpiece 18 while the minimum grip plane GP' is in line with the outer surface 44' of workpiece 18'. The grip range of the bolt 12 of fastener 10 then is the difference between the grip length GL for the maximum grip condition (see FIG. 4) and the grip length GL' for the minimum grip condition (see FIG. 5). The pitch, P, of the threads 29 is the axial distance from the flank of a full thread at the pitch diameter DP to the corresponding flank location at the next full thread (see FIG. 2). For a conventional thread form, the pitch diameter DP is approximately the same as the original or base diameter of the small diameter bolt shank portion 28 prior to roll forming the thread 29 such as shown in the unthreaded section 28'. Each fully formed thread has a crest 30 and a root 32. The large diameter shank portion has a uniform diameter DS. The crests 30 have a diameter DC while the roots 32 have a diameter DR. The diameter DC of the thread crests 30 routinely will be less than the large shank portion diameter DS. Thus in a close tolerance or an interference fit application between the large diameter shank portion DS and the workpiece bores 17, 19 (17', 19') the diameter DC of thread crests 30 will be in a clearance relationship to these workpiece bores 17, 19 (17', 19').

The thread 29 on the shank portion 28 has a run-out section 34 with a root 32' of gradually reduced depth and a crest 30' of gradually reduced height. Here the run-out of the thread 29 gradually tapers from its fully formed dimensions to the point where it terminates at an end segment 36 which extends arcuately to the original blank of reduced or pitch diameter DP. In one form of the invention the run-out section 34 extended axially for around ¼ P and circumferentially for around ⅓ to around ½ of the circumference of a fully formed thread at the pitch diameter DP. This means that the axial length Lr of the run-out section 34 from the end wall 35 of the transition portion 26 to the beginning of the run-out section 34 is substantially minimized to around ¼ P. (See FIG. 2). This also means that at a longitudinal or axial distance Ltr from the maximum grip plane GP corresponding to between around ⅔ P to a maximum of 1.0 P, the thread 29 will have its full dimension. As can be seen in FIG. 2, the distances Lr and Ltr are measured from the center of the first fully formed thread which has a root 32 of full depth and a crest 30 of full height with a fully formed flank and the length Ltr defines the run-out zone.

Figure 2A:
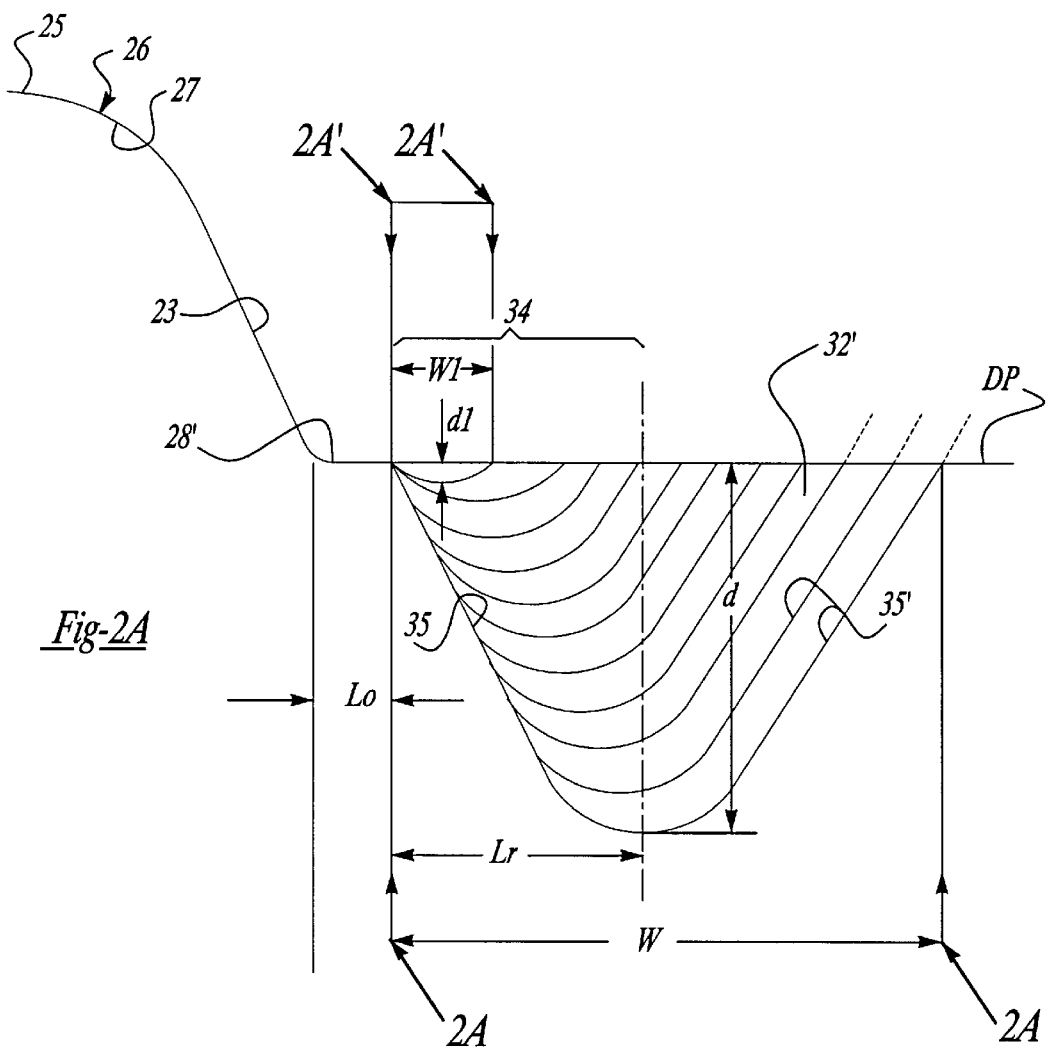
FIG. 2A is a series of sectional views to enlarged scale taken generally between lines 2A—2A and 2A'—2A' in FIG. 2 of the contour of the thread in the run-out section with the sections being overlaid in a flat plane along a simulated straight line rather than helically or circumferentially and showing the gradual reduction in depth and width of the run-out thread.
Figure 2B:
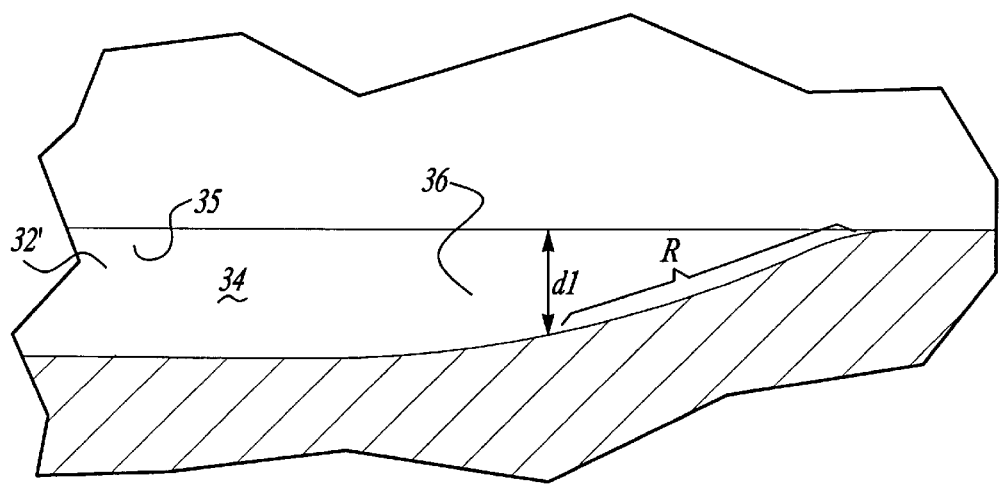
FIG. 2B is an enlarged sectional view of the end segment and arcuate transition at the termination of the run-out generally taken between the lines 2B—2B in FIG. 2.

As noted, in the present invention, the run-out section 34 of the thread while of shortened length is gradual. As can be seen in FIGS. 2A and 2B, the depth of the run-out thread, gradually and uniformly decreases and tapers from the full depth d and full width W of the adjacent, full threads and reduced gradually to a minimal depth d1 and to a minimal width W1 at the end segment 36. End segment 36 terminates with a small but generous multi-radiused arcuate transition R having a generally tear drop shape with a concave end radius blending to a final convex radius which breaks any corner between the concave radius and the surrounding unrolled surface section 28' of the small diameter shank portion 28. (See FIGS. 2 and 2B). The arcuate transition R from the beginning of the concave radius at the end segment 36 will extend radially outwardly to the surface of the unrolled section 28' of small diameter shank portion 28 or pitch diameter DP of a minimal depth d1. Thus the contour of run-out root 32' is smooth; that is, its reduction is uniformly gradual and not discontinuous and it terminates at the end segment 36 in the generously arcuate transition R providing a smooth blend and not an abrupt ending.

The crest 30 of the thread on the bolt 12 is complete and the active surface of the flank and full depth root is fully developed at all distances greater than between around ⅔ P to a maximum of 1.0 P from the center of the adjacent full depth root to the maximum grip plane GP. This defines a run-out zone of minimal length and assures maximum load carrying capability and lightest weight of the bolt 12. In this regard, it should be noted that a full thread crest 30 is not formed at the lead in chamfer section 31.

As can be seen and will be further noted in the description of the thread rolling dies and rolling process, the threads 29 and the run-out section 34 are rolled entirely on the reduced diameter shank portion 28. Thus none of the thread of run-out section 34 extends into the separate transition portion 26 which blends the large diameter shank portion 22 to the small diameter shank portion 28, i.e. unrolled section 28'. This is unlike some other bolt constructions as previously noted in which the thread run-out is formed in the transition portions which blend the large and small diameter shank portions or extends into a relief groove. See the '265 and '441 patents and '510 and '401 patents noted above. It is believed that this may also provide an improvement in the life of the rolling dies to be described and also in the reduction of laps, folds and other undesirable features in the run-out.

With the construction of the present invention, the axial length Lt of the transition portion 26 is of a minimum length sufficient for the gradual connection between and blending of the large diameter smooth shank portion 22 and the section 28' of the small diameter threaded shank portion 28. The run-out section 34 is formed with an end wall surface 35 which extends circularly, not helically, along a line transverse to the central axis X of the bolt 12 and thus is in parallelism to the adjacent end of the transition portion 26. The opposite wall surface 35' extends along a helical line similar to that of the preceding full threads and as such moves gradually, helically towards the non-helical circular end wall surface 35. This can be seen in FIG. 2A where the end wall 35 while being reduced in depth moves circularly in a straight line while the opposite wall 35' extends helically gradually moving towards the end wall 35. The circular, parallelism of end wall surface 35 continues for substantially the full circumferential length of the run-out section 34 with the opposite, helical end wall surface 35' approaching until they reach the arcuate transition R where the wall surfaces 35 and 35' curve slightly towards each other to meet at the end of run-out into the tear drop shape (see FIGS. 2, 2A and 2B). This permits the substantial reduction in full groove width W from the beginning of run-out section 34 to the reduced narrow width WI to provide the run-out section 34 with an overall contour which facilitates its minimization in circumferential and axial length while providing a close match with the contour of the nut thread run-in to be described. In this regard it can be seen that the angled contour of the flanks of the run-out thread 32' remains substantially the same throughout the run-out section 34. The minimization of the circumferential and axial length of run-out section 34 by the use of the unique contour of the run-out by the annular, non-helical end wall 35 and opposite helical end wall 35' can be readily seen in FIGS. 2 and 2A. It can also be seen that the end wall 35 is located only a minimal distance from the center of the arcuate transition R.

Thus it can be seen that if the end wall 35 were to extend helically for even a portion of the circular, non-helical length of the run-out section 34 that the axial length of the run-out section 34 would be increased. In such case the circumferential and axial length of the run-out to achieve a full formed thread would be substantially increased. Along this line, the annular, non-helical end surface 35 of run-out section 34 permits the run-out section 34 to be spaced only a short axial distance Lo from the inner end of the transition portion 26. This, along with the short axial extent Lr of the run-out section 34, permits the small diameter threaded shank portion 28 to be of minimal length. At the same time, as noted, the length and size of the larger diameter transition portion 26 has been minimized. This provides the overall length Ltr of the combined length Lt of transition portion 26, the length Lo and length Lr of run-out section 34 to be minimized. These features also result in the minimization of the length and weight of the bolt 12. As will be seen this also assists in use of the bolt 12 with a nut member 14 of minimized size and weight.

Figure 3:
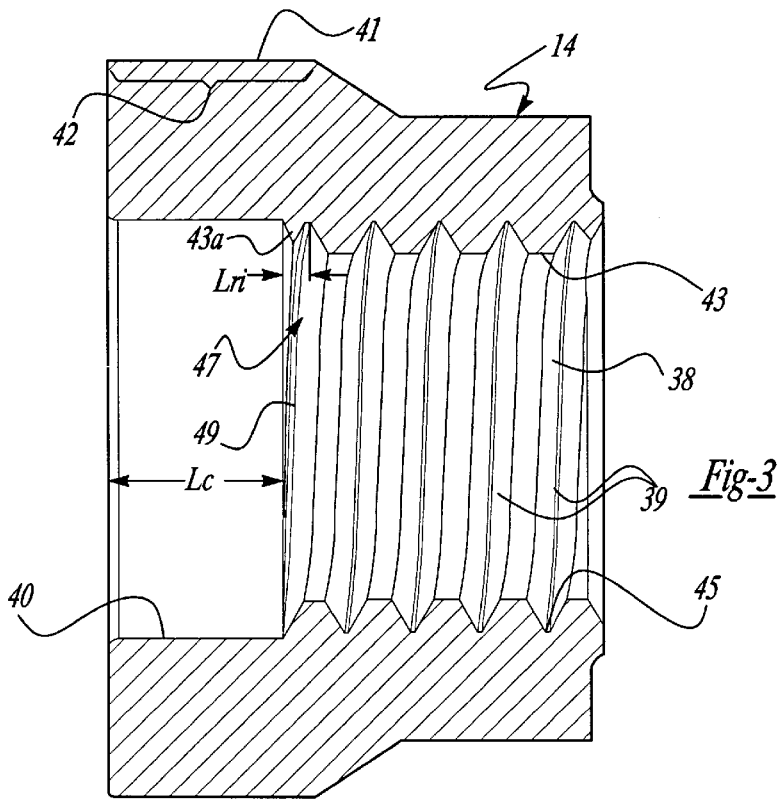
FIG. 3. is a longitudinal sectional view of a nut member for use with the bolt of FIG. 1.
Figure 4:
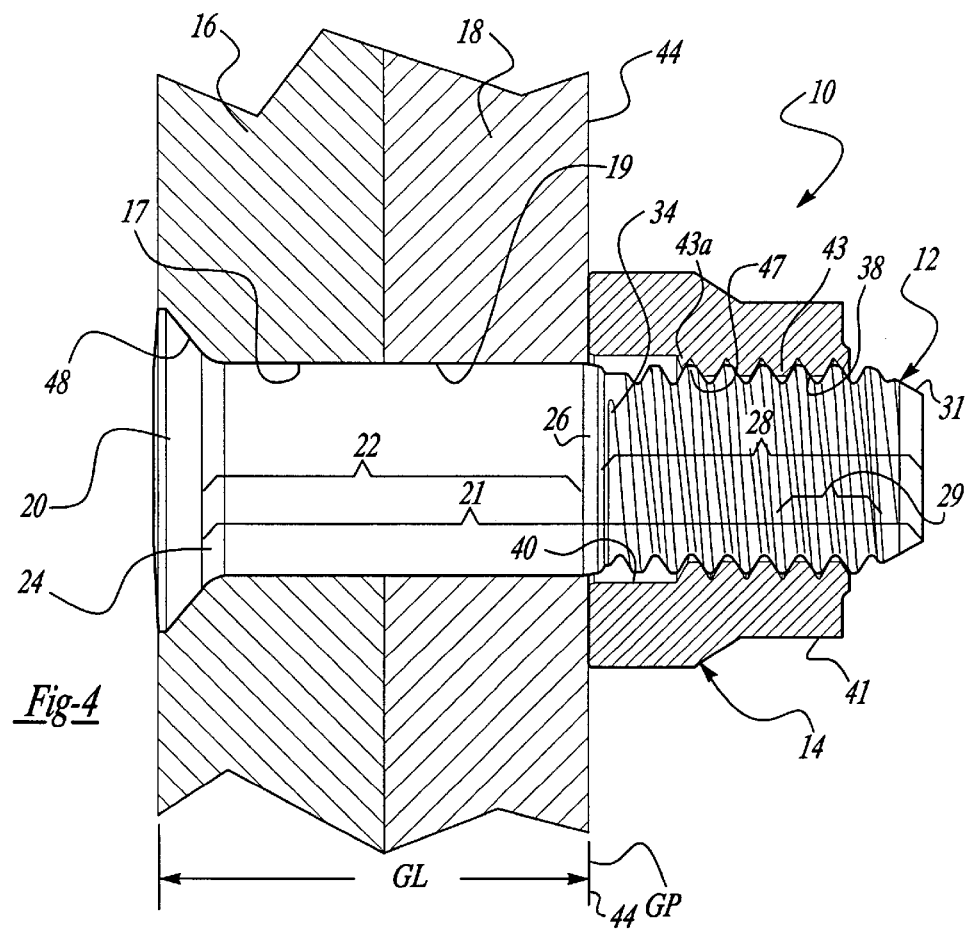
FIG. 4 is an elevational view of a fastener including the bolt and nut of FIGS. 1–3 in assembled condition with the nut shown in section and located for securing workpieces together of a maximum total thickness or maximum grip.

A generally typical nut member 14 is illustrated in FIG. 3 and has a threaded bore 38 with threads 39 and a smooth enlarged diameter counterbore 40 located at the inner end of the threaded bore 38 and in an enlarged diameter boss portion 42. The nut member 14 can have irregularly formed wrenching surfaces on its radially outer surface such as outer surface 41 at the axially outer end to permit gripping by a conventional wrench or tool.

The nut threads 39 generally have a fully formed minor diameter 43 and crests 45 and a run-in section 47 of an incomplete thread 49 of an increasingly larger minor diameter and hence with a larger minor diameter 43a and of reduced radial height. The nut run-in section 47 then extends from the axially inner end of the counterbore 40 into the fully formed thread of the nut threads 39. Thus in one form of nut member 14 with a typical thread form the run-in section 47 extends into the threaded bore 38 from the inner end of the counterbore 40 to the smaller, minor diameter of the full nut threads 39 at a distance Lri of around 0.5 P (see FIG. 3).

Figure 5:
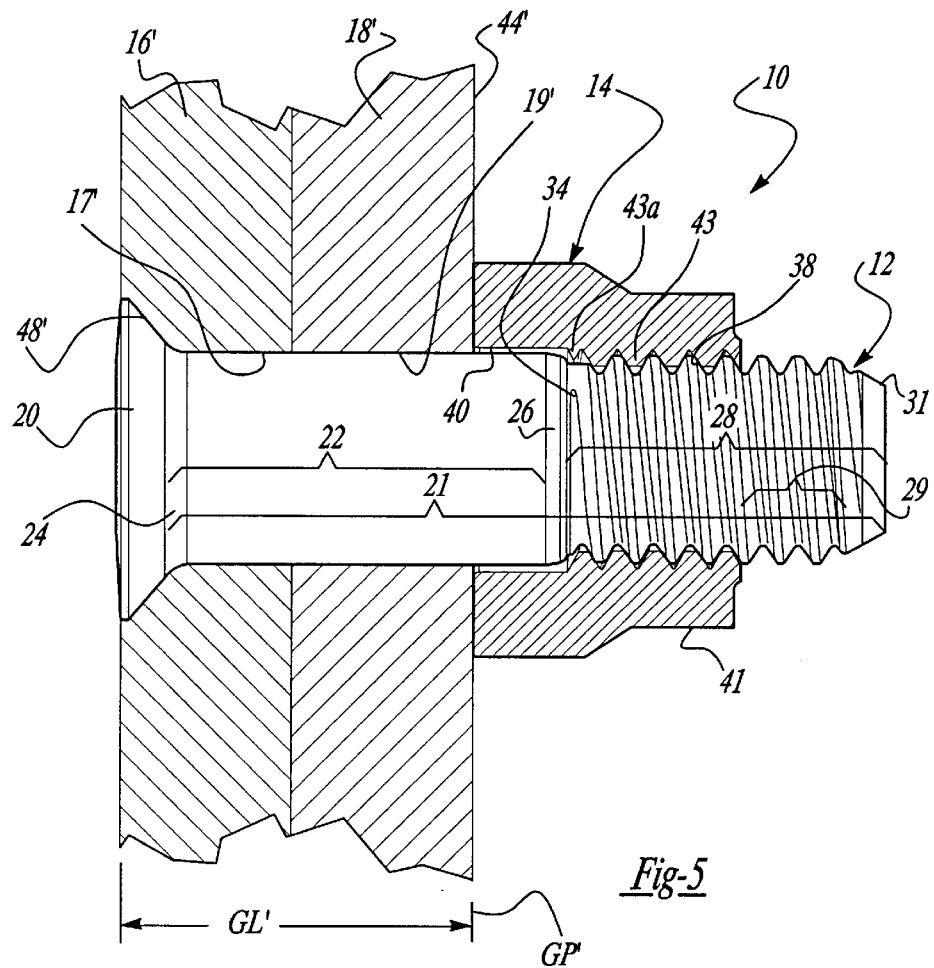
FIG. 5 is a view similar to FIG. 4 depicting the bolt and nut in assembled relationship for securing workpieces of a minimum thickness or minimum grip.

The counterbore 40 is sized to receive in radial and axial clearance the smooth bolt shank portion 22 and the transition portion 26. Thus when the workpieces, such as workpieces 16' and 18' of FIG. 5, are of a total thickness GL' which is less than the maximum grip GL the large diameter shank portion 22 and transition portion 26 will protrude out past the outer surface 44' of workpiece 18' but can fit with clearance within the counterbore 40 of the nut member 14.

Thus the counterbore 40 extends for an axial depth Lc substantially equal to the grip of the bolt member 12 of the fastener 10, i.e. GL–GL', plus around 1.0 P to accommodate the combined axial length Ltr of the section of the transition portion 26 extending past the maximum grip plane and the run-out section 34 of the bolt 12 and the length Lri of run-in section 47 of the nut member 14. The minimal axial length Lt of the transition portion 26, and close axial spacing Lo of the inner end surface 35 of the run-out thread in the run-out section 34 minimizes the length Ltr of the run-out zone and allows the length Lc of the counterbore 40 of the nut member 14 to be reduced resulting in a minimization of the weight of the nut member 14. The result, of course, is a fastener 10 of overall minimized weight. As will be seen the unique construction of the bolt member 12 of the present invention permits it to be used with a nut member 14 having a counterbore 40 of an even shorter depth Lc, i.e. less than 1.0 P plus grip. In this regard and also as will be noted, the unique form of the minimized bolt run-out section 34 will permit the thread form of the nut run-in section 47 to substantially fully overlap the run-out section 34. It should be understood that a prevailing torque or lock type structure could be provided between the bolt 12 and nut 14. For example, the axially outer end of the nut 14 could be partially distorted whereby the threaded bore 38 at that location would be somewhat elliptically shaped to provide interference between the bolt threads 29 and the engaged nut threads 39 whereby loosening from vibration is inhibited.

As illustrated in FIGS. 1 and 2, an example of one sized pin or bolt 12 made in accordance with the present invention is a 10–32 UNJF threaded fastener having threads 29 of a form in which the flanks of the thread are at an included angle A of 60°. (See FIG. 2). The fully developed roll formed thread conforms to the applicable standard, such as AS8879 (MIL-S-8879). The 10–32 UNJF threaded fastener is a bolt 12 with a nominal 3/16 inch diameter DS and in which the thread 29 has a pitch P of 0.03125 inch.

The nut member 14 for the 3/16 inch bolt 12 has an exemplary counterbore 40 with a depth Lc of around 0.084 inch (0.03125 inch plus 1/16 inch minus the standard thread clearance of around 1/3 P). The nut run-in section 47 extends into the nut thread 39 for a length Lri of 0.5 P or 0.01563 inch. In one form of the invention for the bolt member 12 of approximately 3/16 (0.190) inch diameter DS of large diameter shank portion 22 the fully formed thread has a pitch diameter DP of 0.16855 inch, a full crest or major diameter DC of 0.1840 inch, and a full root or minor diameter DR of 0.1518 inch; the root depth d from the pitch diameter DP is 0.0161 inch and the width W measured across the pitch diameter DP is 0.01563 inch. In the run-out section 34, which extends for a circumferential distance of 1/3 to 1/2 of the circumference at the pitch diameter DP, these are gradually uniformly reduced at the blend or arcuate transition R at end segment 36 to a minimal depth d1 and the end of minimum width Wi which in turn are radially blended, not sharply, with the unrolled surface section 28'. In this regard the concave radius at the terminus of arcuate transition R at end segment 36 provides the smooth radial blend. The radius of the first arcuate section 25 of the transition portion 26 is 0.075 inches while the radius of the second, reduced arcuate section 27 is 0.006 inches. At the same time the axial length Lt of the transition portion 26 is around 0.0186 inches or around 0.6 P and the clearance distance Lo of the parallely extending, axially inner end wall 35 of the run-out section 34 to the transition portion 26 is around .0023 inch. The distance Lm from the maximum grip plane GP to the end of the transition portion 26 is 0.0143 inch. The tapered section 23 extends at a relatively steep angle At relative to a line transverse to the axis X of the bolt 12. This assists in minimizing the overall length of the transition portion 26. For the above example of the 3/16 inch bolt member 12 the angle At is 30°. However, an angle At of between around 25° to around 35° is acceptable. In some instances an angle At of between 25° to 55° can be utilized; however, the larger angle At most likely would result in the axial length Lt of transition portion 26 being slightly longer. Except in the nut run-in section 47 described hereinafter, the thread 39 on the nut member 14 engages the bolt thread 29 in a conventional manner.

It is desirable, as mentioned above, to reduce the length of the boss portion 42 by reducing the depth Lc of the counterbore 40 in the nut 14, so that the total length of the nut 14 can be reduced as a result of the reduction in the length of the bolt 12. Conventional aerospace nuts have had a counterbore depth Lc of 1/16 inch plus 2.0 P so that the run-out zone on a conventional bolt is completely cleared by the nut when the nut is tightened in the minimum grip condition.

In one form of the present invention, the depth Lc of the counterbore 40 is preferably 1/16 inch (i.e. the difference between the maximum grip and minimum grip) plus around 1.0 P minus the standard thread clearance of around 1/3 P. In such an embodiment, when threaded onto the bolt 12 in the minimum grip condition, the outer end of the run-in section 47 of the nut thread 39 is minimally spaced from the maximum grip plane GP.

It is a feature of the present invention that, in the minimum grip condition, when the nut 14 is threaded onto the bolt 12 the incomplete threads in the nut run-in section 47 can substantially overlap and engage the incomplete bolt threads in the run-out section 34. At the same time the incomplete thread minor diameter of the run-in on the nut 14 can clear the incomplete thread root in the run-out of the bolt 12. As this occurs, at least a portion of the flanks of the bolt run-out thread engage the flanks of the incomplete thread in the nut run-in which can contribute to the tensile strength of the fastener 10 in the minimum grip condition.

Thus, when the nut 14 is tightened against minimum grip workpieces 16', 18' there is also a contribution to the tensile strength of the nut 14 and bolt 12 assembly by the engagement of the incomplete nut thread in the run-in section 47 with the incomplete thread on the bolt in the run-out section 34. More importantly, however, is the fact that the unique structure of the bolt run-out section 34 of the present invention permits a substantial overlap with the nut thread run-in section 47. As noted, it is standard practice to provide the fully formed bolt threads 29 and fully formed nut member threads 39 to have a slight clearance between their respective thread forms, i.e., crests and roots when engaged. This plus the unique form and location of the run-out section 34 permits the reduced nut thread form 43a of the nut thread run-in section 47 to slightly overlap the unthreaded section 28' of the small diameter shank portion 28 in the minimum grip condition (see FIG. 5). This also permits somewhat greater grip capability of the bolt 12 and nut 14 relative to the thickness of workpieces 16', 18'.

Figure 6:
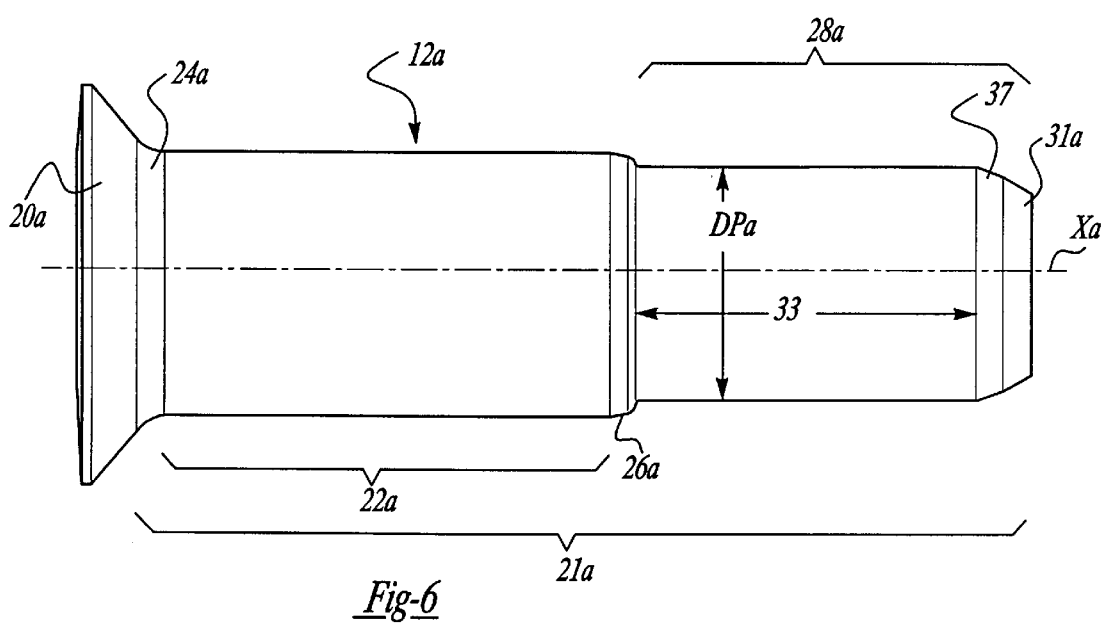
FIG. 6 is an elevational view of a blank for a bolt prior to forming the threads by rolling.
Figure 9:
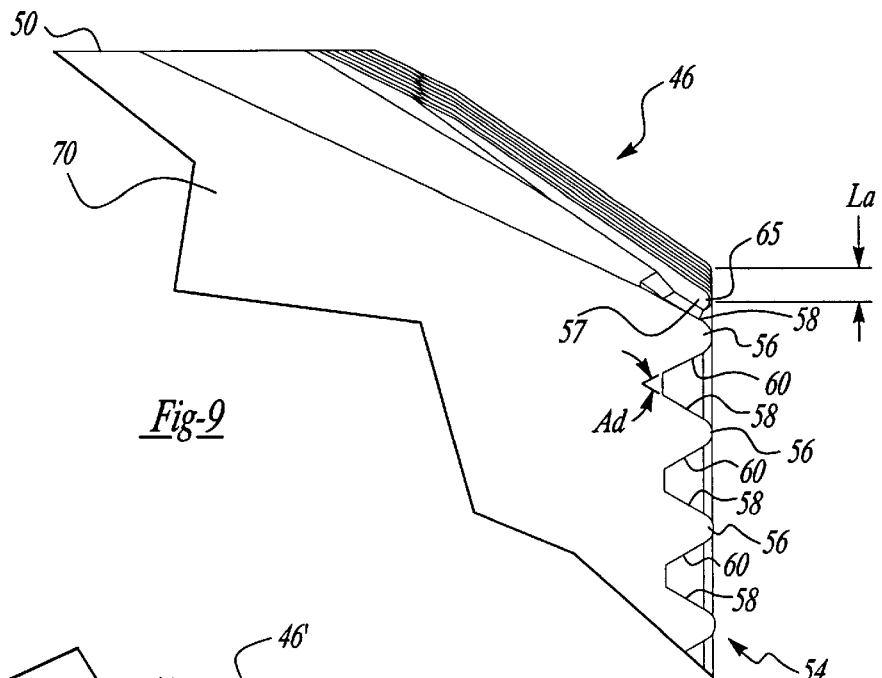
FIG. 9 is a fragmentary end view to enlarged scale of the rolling die of FIG. 7 taken generally in the direction of the Arrows 9—9 in FIG. 7.

The threads 29 on the small diameter shank portion 28 are formed by rolling on a preformed bolt blank 12a as shown in FIG. 6. In the description of the bolt blank 12a the areas on the blank 12a which correspond to similar areas on the fully formed bolt 12 are given the same reference numeral with the addition of the letter postscript "a" and are of the same construction except as otherwise described.

Looking to FIG. 6 it can be seen that the bolt blank 12a is substantially identical to the bolt 12 except for the small diameter shank portion 28a and the formation of the bolt threads 29 including the thread run-out in run-out section 34 by rolling to be described. Thus the bolt blank 12a includes the flush head 20a from which extends the shank 21a with the large diameter cylindrical, smooth shank portion 22a connected to the head 20a by the radiused section 24a. The small diameter axially outer shank portion 28a is of a diameter DPa over a main uniform diameter section 33 and terminates at its outer end in chamfered section 31a which in turn is connected to the uniform diameter section 33 by a tapered chamfer transition section 37. The tapered transition section 37 is of a smaller included angle than that of the chamfer section 31a to provide a gradual transition to the main uniform section 33 to facilitate thread forming during rolling. The short transition portion 26a connects the large diameter smooth shank portion 22a to the small diameter axially outer shank portion 28a on which threads 29 are to be formed. The uniform diameter DPa of the section 33 of the outer shank portion 28a corresponds approximately to the pitch diameter DP of the fully formed threads 29 (see FIG. 2).

The bolt blank 12a is normally formed by heading from metal wire or rod and can include other machining operations as required to form the desired geometry.

The thread on the shank portion 28a of the bolt blank 12a is produced by a pair of generally identical thread-rolling dies 46 and 46', as illustrated in FIGS. 7–10. One of the dies 46 is stationary, while the other die 46' is movable. While dies 46, 46' are generally rectangular and flat it should be understood that dies of other configurations, such as cylindrical or round, could also be made embodying the features of the present invention. The dies 46, 46' are used to roll form the threads 29 including the run-out thread on the uniform section 33 of the small diameter outer shank portion 28a and on the chamfer transition section 37 and into the chamfer section 31a of the blank 12a.

The threads 29 are roll formed by a plurality of ridges 56 extending across the front face 54 of the dies 46, 46'. As will be seen the contour of the thread in the run-out section 34 is formed by modifying the shape ground on the upper edges of the series of upper ridge segments 57 of the rolling dies 46, 46'. The edges of the upper ridge segments 57 of the dies 46, 46' are formed to a shape complementary to the contour of the thread in the run-out section 34 as hereinabove described and illustrated in FIG. 2.

Since the stationary and movable dies 46, 46' are substantially identical only the stationary die 46 is illustrated in detail in FIGS. 7 and 8 and hence only the details of die 46 will be described. It should be understood that the movable die 46' is conventionally longer than the stationary die 46. It should be understood, however, that stationary dies, such as die 46, routinely have entrance and exit ends curved or otherwise tapered to facilitate the entry and exit of the bolt blank. Such routine structure has not been shown for purposes of simplicity. The die 46 includes flat, parallel, longitudinally extending upper and lower surfaces 50 and 52 which are transverse to the front face 54. As noted, a series of the parallel ridges 56, which are used to produce the thread, are formed on the front face 54. It is, however, optional to also form the ridges 56 on the opposite face of the die 46 as well. The contour of the ridges 56 are complementary to the thread to be produced, and therefore is generally V-shaped in end elevation. In accordance with standard practice, these ridges 56 include upper and lower flanks 58 and 60, conventionally at a 60° included angle Ad between them. (see FIG. 9). The ridges 56 are at an acute angle longitudinally relative to the upper and lower surfaces 50 and 52, appropriate for producing a thread helix when the blank section 33 of outer shank portion 28a is rolled between the dies 46 and 46'.

Between the upper surface 50 of the die 46 and the front face 54 is a series of stepped, beveled surfaces 62 each of which includes one of a series of the upper die ridge segments 57 which define the upper die edge of the front die face 54.

Lengthwise of the die 46, the ridge ends 64 are spaced apart a distance Lb that is approximately the same as the circumference of the thread to be produced at its pitch diameter DP. This encompasses some variation from the precise circumferential distance. For example, the distance Lb for the die 46 to produce a fastener pin of titanium may fall within the range of around $\pi \times 0.8 \times$ pitch diameter DP of the thread to $\pi \times 1.0 \times$ pitch diameter DP of the thread. This is because it is impossible as a practical matter, to have each end 65 engage the blank 12a at precisely the same location. Therefore, the gradual increase in height of the ridge ends 65 assures that each successive ridge end 65 engages the blank 12a at a position slightly beyond where the preceding ridge end 65 had engaged it. Such gradual, progressive engagement also provides some protection of the dies 46, 46' from breakage.

Consequently the spacing between the upper ridge segments 57 is made such that there is an increase in height from one to the next from the entrance die end 70, where the thread rolling begins, to the opposite, exit end 72 where rolling stops and the rolled blank is ejected. As shown in FIGS. 7 and 8, the upper ridge segment 57 at the exit die end 72 is at a distance d3 closer to the top die surface 50 than the distance d4 of the preceding upper ridge segment 57. The same slight height differential or spacing (d4–d3 and similarly d2–d1) of adjacent ones of upper ridge segments 57 applies throughout the length of the die 46.

In the construction of the dies 46, 46' of the present invention, each of the beveled surfaces 62, 62b and 62c have end walls 66 extending rearwardly along the tapered sections 64 from the front face 54. Thus the beveled surfaces 62, 62b and 62c, their associated end walls 66 and the upper ridge segments 57 with the arcuate ends 65 are sequentially stepped or spaced transversely upwardly farther from each other and from the lower die surface 52 in a direction from the entrance end 70 of the die 46, 46' where the bolt blank 12a first enters to the exit end 72 (see FIGS. 6, 7 and 9).

The beveled surfaces 62b and 62c at the entrance and exit ends 70 and 72 of the die face 54 are of shorter lengths as a result of centering the beveled surfaces 62 within standard length dies used with conventional thread rolling equipment. Each of the beveled surfaces 62, 62b and 62c is provided with a tapered, leading end section 64 which gradually extends to the upper flank 58 of the ridge segment 57 that it intersects. As will be seen the tapered sections 64 provide a gradual reduction in width and depth of the ridge segments 57 along the longitudinal length of the tapered surface to define outer leading edges 57'. This reduction terminates at the leading edges 57' of the ridge segments 57 with arcuate leading ends 65.

The main or untapered sections 62' of these beveled surfaces 62 are at an angle of 15° or in a range of 10° to 30° relative to the horizontal top surface 50 and parallel to and along the longitudinal angle of the ridges 56. The tapered sections 64 of beveled surfaces 62 are at an angle of 25° or in a range of 10° to 30° relative to the horizontal top surface 50 and longitudinally parallel to the top surface 50.

The outer leading edges 57' of the upper ridge segments 57 defined by the tapered end sections 64 of the beveled surfaces 62 will have arcuate ends 65 which preferably are convexly rounded and blended into the leading edge 57'. As a result, the upper ridge segments 57 will have a tapering cross-sectional dimension along the tapered end sections 64 from the leading edges 57' which blend into a full cross-sectional dimension, symmetrical on either side of their longitudinal axes, at a location close to where they terminate. Thus the formation of the run-out by the upper ridge segments 57 is provided by the leading edges 57' of tapered end sections 64. These tapered end sections 64 and leading edges 57' extend for around ⅓ of the circumference of the thread to be produced at its pitch diameter DP.

In this regard the leading edges 57' of tapered end section 64 as formed extend gradually uniformly inwardly from the front die face 54. This will result in associated flanks such as flanks 58 and 60 of gradually decreasing depth and width. Thus the leading edges 57' will mirror the run-out section 34 by providing a gradual decrease in width and depth in the run-out thread. The angulation of the associated lower flank 60, however, is not changed and hence that lower flank extends angularly along the front die face 54 and parallely to the confronting upper flank 58 below it.

The tapered end sections 64 of the upper ridge segments 57 that extend from the arcuate ends 65 to the main section 62' of the beveled surface 62 extend smoothly from the end walls 66 to the main sections 62' which also extend rearwardly to the upper surface 50 of the die 46. This results in the stepped configuration of the beveled surfaces 62, 62b and 62c, dividing it into segments, each of which connects to the flank 58 of one of the upper ridge segments 57. The end walls 66 extend rearwardly and upwardly relative to the beveled surfaces 62 and upper ridge segments 57, being in a plane extending upwardly generally perpendicularly to the upper surface 50. In one form of the die 46, the end walls 66 extend at an angle Ab of 60° relative to the longitudinally extending outer end of one of the adjacent upper ridge segments 57. However, it is believed an angle Ab between 45° and 70° would be satisfactory (see FIGS. 7 and 8).

Lengthwise of the die 46, the upper ridge segments 57, are spaced apart for the length Lb that is slightly less than the circumference of the thread to be produced at its pitch diameter DP. Thus, this may include some variation from the precise full circumferential distance. The tapered end sections 64 define a planar surface which is substantially parallel to the flat upper surface 50. Thus this planar surface will be substantially transversely to the axis Xa of the bolt blank 12a during rolling and hence will provide the end surface 35 to define a wall extending along a transverse line parallel to the end of the transition portion 26. Thus the contour of the edges 57' of the upper ridge segments 57 along the tapered end sections 64 are the mirror image or inverse of the contour of the run-out section 34. As such each of the edges 57' of the upper ridge segments 57 will have a full width W at one end of the tapered end section 64 which is gradually reduced to the width Wi at the opposite arcuate end 65 of the tapered end section 64. At the same time the arcuate end 65 will provide the generous arcuate transition R at the end segment 36 of the run-out section 34.

Figure 10:
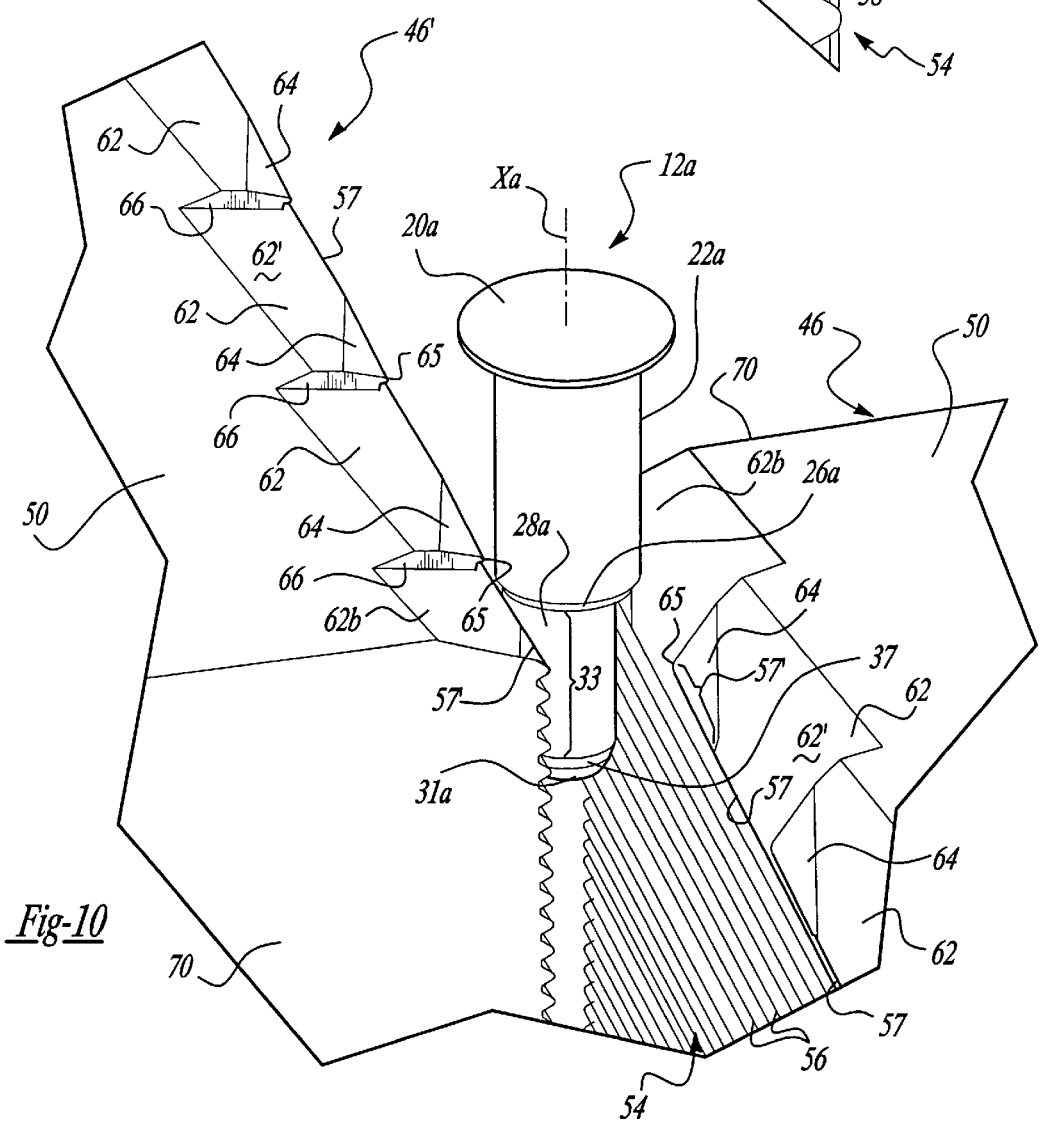
FIG. 10 is an elevational, pictorial view of the thread rolling dies of the form of FIGS. 7 and 8 with the bolt blank of FIG. 6 in position for the thread rolling operation.

Thus the tapered end sections 64 will fully define the contour of the thread in the run-out section 34 including the gradual reduction in width over its length to the end segment 36 with radius R. The dies of this invention are operated as conventional dies, with the movable die 46' being moved longitudinally relative to the stationary die 46. The bolt blank 12a is positioned prior to the threading operation as shown in FIG. 10, which locates it adjacent to the entrance end 70 of the dies 46, 46' and with its axis Xa perpendicular to the upper die surfaces 50. The small diameter blank section 33 is located between the dies 46 and 46' with the transition portion 26a positioned slightly above the upper ridge segments 57 whereby the arcuate ends 65 will not engage the transition portion 26a. Thus the initial location of the blank 12a between dies 46, 46' will be such as to accommodate stretching of the blank 12a from rolling and to assure that the thread run-out section 34 will be formed solely on the small diameter blank section 33. Therefore, the run-out section 34 of the bolt thread 29 that is produced as the dies 46 and 46' are actuated is formed by the tapered end sections 64 and arcuate ends 65 of the upper ridge segments 57 whereby the relatively short but gradual termination of the thread at the run-out section 34 is formed completely in the small diameter shank section 33, as previously described. At the same time, the bolt thread 29 will be partially formed on the tapered chamfer transition section 37 with an outer thread run-out terminating slightly within the chamfered section 31a.

While it will be apparent that the preferred embodiments of the invention disclosed are well calculated to fulfill the objects stated above, it will be appreciated that the invention is susceptible to modification, variation and change without departing from the proper scope or fair meaning of the invention and the appended claims.

What is claimed is:

1. A thread rolling die for roll forming a thread on a bolt blank comprising a die member having a front face and a generally transversely extending upper surface, said face having a plurality of spaced parallel ridges on said face extending longitudinally at an acute angle to said upper surface, said die member having an entrance end at one side of said front face for receiving the bolt blank to initiate rolling and an exit end at the opposite side of said front face for discharging the bolt blank after rolling, said ridges being complementary to a thread to be produced and each having an upper and lower flank defining a preselected width and transverse depth, a plurality of beveled surfaces extending angularly from said upper surface to said face and terminating in a plurality of ridge segments each having a leading edge section extending longitudinally from an outer, leading end nearest the die entrance end to an adjacent trailing section, said beveled surfaces defining a wall extending from said leading end transversely to said upper surface, said leading ends of said leading edge sections being progressively closer to said upper surface from said entrance end to said exit end of said die member, each of said beveled surfaces including a tapered planar portion extending over a preselected portion of said beveled surface transversely from and co-extensively with said leading end sections whereby the width of the upper and lower flanks of said ridge segments gradually decrease from the full preselected width at said trailing section to a reduced minimal width at said outer end of said leading end sections, the depth of said upper and lower flanks of said ridge segments gradually decrease from the full preselected depth at said trailing section to a reduced minimal depth at said outer end of said leading end sections, the intersection of said upper flanks of said leading edge sections with said planar portion extending substantially in a straight, non-angulated line across said front face whereby a relatively smooth transition is provided of the reduced width and depth of said upper and lower flanks from said leading end section to the full width and depth in said trailing section for providing a relatively gradual run-out for a thread being produced by said leading end sections of said die member and with said straight line providing an end wall of the run-out having a radially outer end extending circumferentially alone a line generally transverse to the axis of the bolt blank.

2. The thread rolling die of claim 1 for forming a full thread having a preselected pitch P and with said leading end section providing the run-out extending axially for about ¼ P.

3. The thread rolling die of claim 1 for forming a full thread having a preselected pitch P and pitch diameter and with said leading end section providing the run-out extending axially for about ¼ P and circumferentially for around ⅓ to around ½ of the circumference of a fully formed thread at the pitch diameter.

4. The thread rolling die of claim 1 for roll forming the thread on a bolt blank to form a threaded bolt type fastener for a lightweight fastener assembly comprising:

a threaded bolt type fastener for a lightweight fastener assembly comprising
a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth being roll formed generally on said second shank portion of said base diameter and having a preselected pitch P, said rolled thread ending within the length of said second shank portion in a run-out section with a run-out thread having a thread form of non-uniform contour, said run-out thread extending axially for about ¼ P with said run-out thread gradually decreasing in width and depth from said fully formed thread, said run-out thread including an end wall surface having a radially outer end extending circumferentially along a line generally transverse to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located on said second shank portion axially immediately adjacent to said transition portion.

5. A thread rolling die for roll forming a thread on a bolt blank having a large diameter shank portion and a small diameter shank portion smoothly connected by a transition portion from the large diameter to the small diameter, said thread rolling die comprising a die member having a front face and a generally transversely extending upper surface, said face having a plurality of spaced parallel ridges on said face extending longitudinally at an acute angle to said upper surface, said die member having an entrance end at one side of said front face for receiving the bolt blank to initiate rolling and an exit end at the opposite side of said front face for discharging the bolt blank after rolling, said ridges being complementary to a thread to be produced and each having an upper and lower flank defining a preselected width and transverse depth, a plurality of beveled surfaces extending angularly from said upper surface to said face and terminating in a plurality of ridge segments each having a leading edge section extending longitudinally from an outer, leading end nearest the die entrance end to an adjacent trailing section, said beveled surfaces defining a wall extending from said leading end transversely to said upper surface, said leading ends of said leading edge sections being progressively closer to said upper surface from said entrance end to said exit end of said die member,

19 each of said beveled surfaces including a tapered planar portion extending over a preselected portion of said beveled surface transversely from and co-extensively with said leading end sections whereby the width of the upper and lower flanks of said ridge segments gradually decrease from the full preselected width at said trailing section to a reduced minimal width at said outer end of said leading end sections, the depth of said upper and lower flanks of said ridge segments gradually decrease from the full preselected depth at said trailing section to a reduced minimal depth at said outer end of said leading end sections, the intersection of said upper flanks of said leading edge sections with said planar portion extending substantially in a straight, non-angulated line across said front face whereby a relatively smooth transition is provided at the reduced width and depth of said upper and lower flanks from said leading end section to the full width and depth in trading section for providing a relatively gradual run-out for a thread being produced by said leading end sections of said die member and with said straight line providing an end wall of the run-out having a radially outer end extending circumferentially along a line generally transverse to the axis of the bolt blank, said front face of said die member adapted to have said ridges and ridge segments engage the small diameter shank portion with said leading edge section engaging the small diameter shank portion immediately adjacent to the transition portion whereby the thread run-out is formed on a section of the small diameter portion immediately adjacent the transition portion.

6. The thread rolling die of claim 4 for forming a full thread having a preselected pitch P and with said leading end section providing the thread run-out extending axially for about ¼ P and with the run-out zone of the finally formed bolt extending axially from between ⅔ P and no greater than 1.0 P.

7. The thread rolling die of claim 4 for forming a full thread having a preselected pitch P and pitch diameter and with said leading end section providing the run-out extending axially for about ¼ P and circumferentially for around ⅓ to around ½ of the circumference of a fully formed zone at the pitch diameter and with the run-out zone of the finally formed bolt extending axially from between ⅔ P and no greater than 1.0 P.

8. A threaded bolt type fastener for a lightweight fastener assembly comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth

20 being roll formed generally on said second shank portion of said base diameter and having a preselected pitch P, said rolled thread ending within the length of said second shank portion in a run-out section with a run-out thread having a thread form of non-uniform contour, said run-out thread extending axially for about ¼ P with said run-out thread gradually decreasing in width and depth from said fully formed thread, said run-out thread including an end wall surface having a radially outer end extending circumferentially along a line generally transverse to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located axially immediately adjacent to said transition portion.

9. The threaded bolt type fastener of claim 7 with said transition portion having an axial length of around 0.6 P.

10. A threaded bolt type fastener for a lightweight fastener assembly comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth being roll formed on said second shank portion of said base diameter and having a preselected pitch P, said rolled thread ending within the length of said second shank portion in a run-out section with a run-out thread having a thread form of non-uniform contour, said run-out thread extending axially for about ¼ P and circumferentially for no more than around ⅓ to ½ the circumference of said rolled thread as fully formed and at its pitch diameter so as to provide said run-out thread of gradually decreasing width and depth from said fully formed thread, said run-out thread including an end wall surface having a radially outer end extending circumferentially along a line generally transverse to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located on said second shank portion axially immediately adjacent to said transition portion.

11. The threaded bolt type fastener of claim 9 with said transition portion having an axial length of around 0.6 P.

12. In a lightweight fastening assembly for joining workpieces varying in total thickness from a preselected minimum total thickness to a maximum total thickness with the outer surface of the workpieces of maximum total thickness defining a maximum grip plane and with the fastening assembly including a bolt type fastener having a shank with a thread adapted to be located outside of the workpieces past the outer surface and the maximum grip plane and with the thread having a generally uniform contour and terminating in a run-out thread of non-uniform contour and with a run-out zone being the axial distance from the maximum grip plane to the location on the bolt shank of a fully formed thread at the beginning of the run-out thread, said threaded bolt type fastener comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth being roll formed generally on said second shank portion of said base diameter and having a preselected pitch P, said rolled thread ending within the length of said second shank portion in a run-out section with a run-out thread having a thread form of non-uniform contour, said run-out thread extending axially for about ¼ P with said run-out thread gradually decreasing in width and depth from said fully formed thread, said run-out thread including an end wall surface having a radially outer end extending circumferentially along a line generally transverse to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located on said second shank portion axially immediately adjacent to said transition portion, said second shank portion extending past said maximum grip plane when said bolt type fastener is assembled to workpieces of maximum total thickness and said bolt fastener having a minimal run-out zone from around ⅔ P to no greater than 1.0 P.

13. The threaded bolt type fastener of claim 11 with said transition portion having an axial length of around 0.6 P.

14. In a lightweight fastening assembly for joining workpieces varying in total thickness from a preselected minimum total thickness to a maximum total thickness with the outer surface of the workpieces of a maximum total thickness defining a maximum grip plane and with the fastening assembly including a bolt type fastener having a shank with a thread adapted to be located outside of the workpiece past the outer surface and the maximum grip plane and with the thread having a generally uniform contour and terminating in a run-out thread of non-uniform contour and with a run-out zone being the axial distance from the maximum grip plane to the location on the bolt shank of a fully formed thread at the beginning of the run-out thread, said threaded bolt type fastener for a lightweight fastener assembly comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth being roll formed on said second shank portion of said base diameter and having a preselected pitch P, said rolled thread ending within the length of said second shank portion in a run-out section with a run-out thread having a thread form of non-uniform contour, said run-out thread extending axially for about ¼ P and circumferentially for no more than around one-third to one-half the circumference of said rolled thread as fully formed and at its pitch diameter so as to provide said run-out thread of gradually decreasing width and depth from said fully formed thread, said run-out thread including an end wall surface having a radially outer end extending circumferentially generally transverse to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located on said second shank portion axially immediately adjacent to said transition portion, said second shank portion extending past said maximum grip plane when said bolt type fastener is assembled to workpieces of maximum total thickness and said bolt fastener having a minimal run-out zone from around ⅔ P to no greater than 1.0 P.

15. The threaded bolt type fastener of claim 13 with said transition portion having an axial length of around 0.6 P.

16. The method of producing a lightweight threaded bolt type fastener for securing workpieces varying in total thickness from a minimum to a maximum total thickness and with the total maximum thickness being the grip length of the bolt type fastener, said bolt type fastener having a head and a shank projecting from said head, said shank including a first unthreaded shank portion of a first large diameter adjacent said head, said first shank portion having a first predetermined length and cooperating with said head to define the grip length of said bolt type fastener, a second shank portion of a second and smaller diameter and a second predetermined length at the outer end of said shank, said second shank portion having a rolled thread thereon of a predetermined pitch P with crests and roots of a substantially constant width and depth of full dimension for generally the length of said second shank portion, and a transition shank portion of a minimal length interconnecting said first and second shank portions, said thread terminating in a run-out thread gradually decreasing in width and depth at a run-out section on said second shank portion adjacent to said transition shank portion, comprising the steps of providing a blank having a head, and a shank extending from said head of said blank, with said shank of said blank having a first blank shank portion of said first diameter and first predetermined length adjacent said head of said blank, a second blank shank portion of a second blank diameter less than said first diameter and of a second predetermined length at the outer end thereof, and a transition blank portion interconnecting said first and second blank shank portions and extending axially a predetermined length and differing in diameter from said first and second blank shank portions, rolling a thread on said second blank shank portion such that said thread has said predetermined pitch and a substantially constant dimension for most of the length of said second blank shank portion and simultaneously rolling said run-out thread of gradually decreasing width and depth at said run-out section at an inner termination of said thread on said second blank shank portion adjacent to said transition blank portion so as to provide a gradual end of said thread at said run-out section, said run-out thread formed with an end wall surface having a radially outer end extending circumferentially generally transverse to the longitudinal axis of said shank, said run-out thread being formed with the wall surface axially opposite said end wall surface extending helically to gradually approach said end wall surface in an end segment whereby the run-out thread is gradually reduced in depth and width to a transition which smoothly blends said end segment to said second blank diameter at said run-out section in said second blank shank portion, said run-out thread formed to extend axially for about ¼ P.

17. The method of claim 16 with said run-out thread formed to extend circumferentially for no more than around ⅓ to ½ the circumference of the fully formed thread at its pitch diameter.

18. The method of claim 16 with said transition portion being formed to have an axial length of around 0.6 P.

19. The method of claim 15 with said run-out thread formed to extend circumferentially for no more than around one-third to one-half the circumference of the fully formed thread at its pitch diameter and said transition portion being formed to have an axial length of around 0.6 P whereby the run-out zone of said bolt type fastener is from around ⅔ P to no greater than 1.0 P.

20. A lightweight threaded bolt type fastener made in accordance with the method of claim 16.

21. A lightweight threaded bolt type fastener made in accordance with the method of claim 19.

22. The method of producing a lightweight threaded bolt type fastener using a thread rolling die for rolling said thread including said run-out thread on said run-out section, said thread rolling die comprising a die member having a front face and a generally transversely extending upper surface, said face having a plurality of spaced parallel ridges on said face extending longitudinally at an acute angle to said upper surface, said die member having an entrance end at one side of said front face for receiving the bolt blank to initiate rolling and an exit end at the opposite side of said front face for discharging the bolt blank after rolling, said ridges being complementary to a thread to be produced and each having an upper and lower flank defining a preselected width and transverse depth, a plurality of beveled surfaces extending angularly from said upper surface to said face and terminating in a plurality of ridge segments each having a leading edge section extending longitudinally from an outer, leading end nearest the die entrance end to an adjacent trailing section, said beveled surfaces defining a wall extending from said leading end transversely to said upper surface, said leading ends of said leading edge sections being progressively closer to said upper surface from said entrance end to said exit end of said die member, each of said beveled surfaces including a tapered planar portion extending over a preselected portion of said beveled surface transversely from and co-extensively with said leading end sections whereby the width of the upper and lower flanks of said ridge segments gradually decrease from the full preselected width at said trailing section to a reduced minimal width at said outer end of said leading end sections, the depth of said upper and lower flanks of said ridge segments gradually decrease from the full preselected depth at said trailing section to a reduced minimal depth at said outer end of said leading end sections, the intersection of said upper flanks of said leading edge sections with said planar portion extending substantially in a straight, non-angulated line across said front face whereby a relatively smooth transition is provided of the reduced width and depth of said upper and lower flanks from said leading end section to the full width and depth in said trailing section for providing a relatively gradual run-out for a thread being produced by said leading end sections of said die member and with said straight line providing an end wall of the run-out having a radially outer end extending circumferentially along a line generally transverse to the axis of the bolt blank.

23. The method of claim 21 for rolling said thread with said thread rolling die for forming the threaded bolt type fastener for a lightweight fastener assembly comprising:

a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon with a fully formed thread being of generally uniform contour with crests of full height and roots of full depth being roll formed generally on said second shank portion of said base diameter and having a preselected pitch P, said rolled thread ending within the length of said second shank portion in a run-out section with a run-out thread having a thread form of non-uniform contour, said run-out thread extending axially for about ¼ P with said run-out thread gradually decreasing in width and depth from said fully formed thread, said run-out thread including an end wall surface extending generally transversely to the longitudinal axis of said shank, said run-out thread having the wall surface axially opposite said end wall surface extending helically to gradually approach said end wall surface in an end segment whereby the run-out thread is gradually reduced in depth and width to a transition which smoothly blends said end segment to said base diameter at said end section of said second shank portion, said end wall surface located on said second shank portion axially immediately adjacent to said transition portion.

24. A threaded lightweight fastener assembly including a threaded bolt type fastener and a mating threaded nut, said bolt type fastener comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon and as fully formed being of generally uniform contour with crests of full height and roots of full depth being formed generally from said base diameter, said rolled thread ending within the length of said second shank portion in a run-out section with a thread form of non-uniform contour, said run-out section extending for no more than around one-half the circumference of said rolled thread as fully formed and at its pitch diameter so as to provide a run-out thread of gradually decreasing width and depth from said fully formed thread, said run-out thread including an end wall surface having a radially outer end extending circumferentially along a line generally transverse to the longitudinal axis of said bolt, said run-out thread having the wall surface axially opposite said end wall surface extending helically to gradually approach said end wall surface in an end segment whereby the run-out thread is gradually reduced in depth and width to an arcuate transition which smoothly blends said end segment to said base diameter at said end section of said second shank portion, said transition portion of said shank having an axial length not exceeding one pitch of said thread, said nut having a through bore with a threaded bore portion at one end connected to an enlarged counterbore portion at its opposite end, said threaded bore portion having a first section with a fully formed nut thread matingly engageable with said fully formed thread on said second shank portion of said bolt shank, said threaded bore portion having a second section with a run-in thread terminating at said counterbore with an incompletely formed nut run-in thread in which the minor diameter gradually increases to the end at said counterbore, said nut run-in section extending for around 0.5 P and said bolt run-out thread being of a form permitting substantial overlap of said nut run-in thread without interference.

25. The lightweight fastener assembly of claim 24 with said nut run-in thread at the end at said counterbore being of a minor diameter to permit said nut to be threaded onto said bolt type fastener with said nut run-in thread at said end overlapping with clearance said second shank portion slightly past the end of said bolt run-out thread.

26. In a lightweight fastening assembly for joining workpieces varying in total thickness from a preselected minimum total thickness to a maximum total thickness with the outer surface of the workpieces of a maximum total thickness defining a maximum grip plane and with the fastening assembly including a threaded bolt type fastener and a mating threaded nut, said bolt type fastener having a shank with a thread adapted to be located outside of the workpieces past the outer surface and the maximum grip plane and with the thread having a generally uniform contour and terminating in a run-out thread of non-uniform contour and with a run-out zone being the axial distance from the maximum grip plane to the location on the bolt shank of a fully formed thread at the beginning of the run-out thread, said threaded bolt type fastener comprising a threaded fastener comprising a member having a head at one end and a shank projecting from said head, said shank including a generally smooth cylindrical first shank portion of an enlarged diameter and a predetermined length adjacent said head, a second shank portion of predetermined length at the outer end thereof having an end section with a base diameter less than said enlarged diameter, and a transition portion being generally arcuately tapered for interconnecting said large diameter of said first shank portion to said base diameter of said end section of said second shank portion and extending axially a predetermined length and gradually tapering in diameter from said enlarged diameter of said first shank portion to said base diameter of said end section of said second shank portion, said second shank portion having a rolled thread thereon and as fully formed being of generally uniform contour with crests of full height and roots of full depth being formed generally from said base diameter, said rolled thread ending within the length of said second shank portion in a run-out section with a thread form of non-uniform contour, said run-out section extending for no more than around one-third the circumference of said rolled thread as fully formed and at its pitch diameter so as to provide a run-out thread of gradually decreasing width and depth from said fully formed thread, said nut having a through bore with a threaded bore portion at one end connected to an enlarged counterbore portion at its opposite end, said threaded bore portion having a first section with a fully formed nut thread matingly engageable with said fully formed thread on said second shank portion of said bolt shank, said threaded bore portion having a second section with a run-in thread terminating at said counterbore with an incompletely formed nut run-in thread in which the minor diameter gradually increases to the end at said counterbore, said nut run-in section extending for around 0.5 P and said bolt run-out thread being of a form permitting substantial overlap of said run-in thread without interference, said second shank portion and at least a part of said transition portion extending past said maximum grip plane when said bolt type fastener is assembled to workpieces of maximum total thickness, said bolt type fastener having a minimal run-out zone of from around $\frac{2}{3}$ P to no greater than 1.0 P, said transition portion and a section of said first shank portion protruding past the outer surface of said workpieces of minimum total thickness by a length equal to the difference between the maximum and minimum total thicknesses, said counterbore of said nut being of size and depth to accept the protruding part without interference and with said run-in thread in overlapping relationship with said run-out thread.

27. The lightweight fastener of claim 26 with said nut run-in thread at the end at said counterbore being of a minor diameter to permit said nut to be threaded onto said bolt type fastener with said nut run-in thread at said end overlapping with clearance said second shank portion slightly past the end of said run-out thread.

* * * * *

UNITED STATES PATENT AND TRADEMARK OFFICE
CERTIFICATE OF CORRECTION

PATENT NO.    : 6,149,363
DATED         : November 21, 2000
INVENTOR(S)   : Michael U. March It is certified that error appears in the above-identified patent and that said Letters Patent is hereby corrected as shown below:

Column 19, claim 5,
Line 19, delete "trading" and substitute therefor -- said trailing --.

Signed and Sealed this

Twelfth Day of February, 2002

Attest:

JAMES E. ROGAN
Attesting Officer
Director of the United States Patent and Trademark Office